(12) United States Patent
Hawkins

(10) Patent No.: US 10,089,853 B2
(45) Date of Patent: Oct. 2, 2018

(54) ESTABLISHMENT AND DETECTION OF BREAKAGE OF WIRELESS LEASH BETWEEN DEVICES

(71) Applicant: APPLE INC., Cupertino, CA (US)

(72) Inventor: Tyler D. Hawkins, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/331,734

(22) Filed: Oct. 21, 2016

(65) Prior Publication Data
US 2017/0039837 A1     Feb. 9, 2017

Related U.S. Application Data

(62) Division of application No. 14/475,452, filed on Sep. 2, 2014, now Pat. No. 9,520,045.

(51) Int. Cl.
*G08B 21/24* (2006.01)
*H04W 4/00* (2018.01)
(Continued)

(52) U.S. Cl.
CPC .......... *G08B 21/24* (2013.01); *G08B 21/0247* (2013.01); *G08B 21/0277* (2013.01);
(Continued)

(58) Field of Classification Search
CPC ................ G08B 21/24; G08B 21/0275; G08B 21/0266; G08B 21/0216; G08B 21/0294; G08B 13/1427
See application file for complete search history.

(56) References Cited

U.S. PATENT DOCUMENTS

| 7,130,664 B1 | 10/2006 | Williams |
| 8,787,006 B2 | 7/2014 | Golko |

(Continued)

FOREIGN PATENT DOCUMENTS

| JP | 2009164780 A2 | 7/2009 |
| JP | 2009164783 A2 | 7/2009 |
| JP | 2010268330 A2 | 11/2010 |

OTHER PUBLICATIONS

Non-Final Office Action dated Feb. 11, 2016, in U.S. Appl. No. 14/475,452, 23 pages.
(Continued)

*Primary Examiner* — Hongmin Fan
(74) *Attorney, Agent, or Firm* — Kilpatrick Townsend & Stockton LLP

(57) ABSTRACT

Companion and accessory devices can be wirelessly leashed together in a manner that enables the devices to estimate their proximities to each other. One device can periodically attempt to detect a signal from the other device. For each attempt, the attempting device can store an indication of whether the signal was detected. If a number of times that the signal was undetected exceeds a threshold, then the attempting device can perform specified operations, such as alerting a user that the wireless leash was broken. As another example, one device can detect that a strength of a signal from the other device exceeds a threshold. In response, the detecting device can measure signal strengths more frequently. If the measuring device then detects that the signal strength exceeds another threshold, then the measuring device can cause specified operations to be performed, such as data synchronization between the devices or unlocking a device.

21 Claims, 8 Drawing Sheets

(51) Int. Cl.
*H04W 4/02* (2018.01)
*H04W 4/80* (2018.01)
*G08B 21/02* (2006.01)

(52) U.S. Cl.
CPC ............ *H04W 4/008* (2013.01); *H04W 4/02* (2013.01); *H04W 4/80* (2018.02)

(56) References Cited

U.S. PATENT DOCUMENTS

| | | | |
|---|---|---|---|
| 2002/0041575 A1* | 4/2002 | Karabinis | H04B 7/18539 |
| | | | 370/319 |
| 2002/0115478 A1 | 8/2002 | Fujisawa et al. | |
| 2006/0058026 A1* | 3/2006 | Ang | H04L 29/06027 |
| | | | 455/434 |
| 2006/0271829 A1* | 11/2006 | Matsumae | G03G 15/55 |
| | | | 714/48 |
| 2007/0167194 A1* | 7/2007 | Brown | H04L 67/24 |
| | | | 455/567 |
| 2010/0253507 A1 | 10/2010 | Jung | |
| 2011/0169654 A1* | 7/2011 | Ketari | G08B 13/1427 |
| | | | 340/687 |
| 2013/0217332 A1 | 8/2013 | Altman | |
| 2013/0331101 A1* | 12/2013 | Thomas | H04W 8/18 |
| | | | 455/435.1 |
| 2014/0011490 A1 | 1/2014 | Ricket | |
| 2014/0045547 A1 | 2/2014 | Singamsetty et al. | |
| 2014/0183269 A1 | 7/2014 | Glaser | |
| 2015/0131464 A1 | 5/2015 | Ukita | |

OTHER PUBLICATIONS

Notice of Allowance dated Jul. 14, 2016, in U.S. Appl. No. 14/475,452, 5 pages.

* cited by examiner

ESTABLISHMENT AND DETECTION OF BREAKAGE OF WIRELESS LEASH BETWEEN DEVICES

RELATED APPLICATIONS

This application is a divisional of U.S. patent application Ser. No. 14/475,452 filed, Sep. 2, 2014, the contents of which are incorporated by reference for all purposes.

BACKGROUND

Some devices, such as smart phones, are so useful for managing various functions of a person's life that people tend to take their devices wherever they go. Such a device can contain information that is valuable to the owner, such as contact information for people with whom the owner frequently communicates. Indeed, people now often rely upon such a device's storage of contact information to the extent that they might not feel the need to remember that contact information.

Such a device may also store information such as a person's calendar, which may include information regarding meetings and appointments about which the device's owner wants to be reminded. Without the device's scheduled reminders, the owner might forget to attend an important event. People have come to rely heavily upon devices in order to help them to remember when and where they need to be at various dates and times.

Such a device often will contain information that is personal and private to the device's owner. A device can sometimes be used to take photographs, to store photographs, to send photographs to others devices, and to receive photographs from other devices. A person might use his device to send and receive text messages. Photographs and text messages stored on a device often will represent sensitive information that the device's owner would not want to be seen by strangers.

Some devices are designed to be portable, and, therefore, relatively small in size and light in weight. The variety of functions that such a device provides is made possible by sophisticated technological components that the device contains. Such components increase a device's expense. This expense makes devices such as smart phones high-demand possessions. The high demand for devices, combined with the ease to which their use can be adapted to different individuals, makes devices especially attractive targets for thieves.

Because owners of these devices tend to take their devices along with them to most places to which they travel, and because these devices are designed to be relatively small and lightweight, it is relatively easy for such a device to be lost or misplaced. A person away from home, at a public venue, might accidentally forget that he set his device down somewhere. Alternatively, a person might not notice that his small and lightweight device has slipped out of his pocket. He might leave the venue without his device in his possession.

For reasons discussed above, the chances of the forgotten device remaining there undisturbed are slim. The loss of the valuable or sensitive information stored on the device, and the cost of replacing the device, can be a serious tribulation for the owner of a lost device. Additionally, to access functionality on a device, one usually has to perform some type of manual authentication process, which can be inconvenient. Embodiments are provided for addressing these and other problems.

BRIEF SUMMARY

Embodiments can provide companion and accessory devices that can be wirelessly leashed together in a manner that enables the devices to estimate their proximities to each other. For example, one device can periodically attempt to detect a signal from the other device. For each attempt, the attempting device can store an indication of whether the signal was detected. If a number of times that the signal was undetected exceeds a threshold, then the attempting device can perform specified operations, such as alerting a user that the wireless leash was broken.

In another example, one device can detect that a strength of a signal from the other device exceeds a threshold. In response, the detecting device can measure signal strengths more frequently. If the measuring device then detects that the signal strength exceeds another threshold, then the measuring device can cause specified operations to be performed, such as data synchronization between the devices or unlocking a device.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Some embodiments involve a companion device in wireless communication with an accessory device, e.g., that a person wears. These devices can estimate when they have traveled more than a threshold distance away from each other. Upon detecting that the threshold distance between the devices has been exceeded, one or both devices can determine that a wireless tether (leash) between the devices has been broken. Upon determining that the wireless leash has been broken, one or both devices can perform operations that are appropriate in view of the breaking of the wireless leash. For example, one or both devices can produce an audible and/or visible alert that apprises the devices' owner that at least one of the devices seems not to be in the immediate possession of the owner, who appears to be traveling away from that device.

An accessory device is usually worn by its owner, and therefore is less susceptible than an unworn companion device to being lost or misplaced as the owner travels about. Thus, if the accessory device, attached to its owner, determines that its wireless leash to the companion device has been broken, then the accessory device can produce a distinctive alert that its owner can hear and/or see. In this manner, the owner can become aware that he might have left his companion device behind at a place from which he is now departing. Having been made aware, the owner can return to that place and retrieve his companion device before someone else does.

Some embodiments involve companion and accessory devices establishing a connection upon determining that the strengths of the signals that one detects from the other exceed a specified threshold.

I. Interdevice Communication

A companion device and an accessory device can be wireless paired, e.g., using a peer to peer connection, such as the Bluetooth protocol. After this pairing has been performed, the two devices can communicate messages to each other wirelessly over radio waves.

Figure 1:
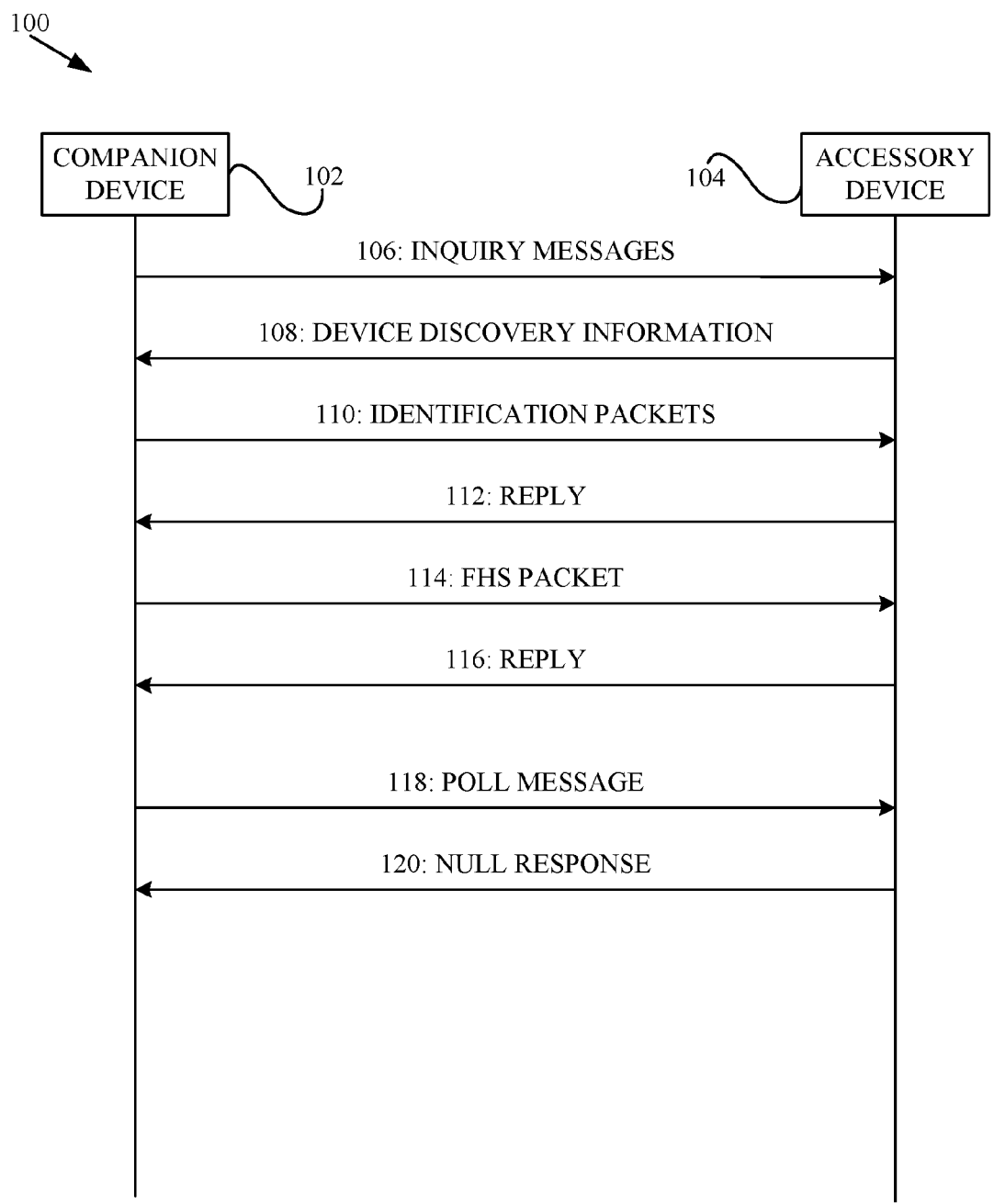
FIG. 1 is a signal flow diagram that illustrates an example of a pair of devices establishing and using a Bluetooth wireless connection, according to some embodiments.

FIG. 1 is a signal flow diagram that illustrates an example 100 of a pair of devices establishing and using a wireless connection, according to some embodiments. FIG. 1 is presented to introduce the concept of communication between devices. Device 102 can be a companion device such as a smart phone, for example. Device 104 can be a wearable accessory device, for example. Wearable accessory devices can be implemented in any wearable article. For example, device 104 can be implemented as or within a watch, a bracelet, a necklace, a ring, a belt, a jacket, glasses, goggles, headphones, ear buds, hearing aids, or the like, or can be placed inside and attached to such articles. Devices 102 and 104 can be any kinds of portable electronic devices, such as a portable music player, a digital camera, a laptop computer, a tablet computer, a digital audio recorder, enhanced reality goggles, headphones, earpieces, or a smart phone, for example. Devices 102 and 104 can be the same or different kinds of devices. Device 102 and device 104 can pass messages to each other wirelessly. Although different communications discussed below are attributed to different ones of devices 102 and 104, the roles of devices 102 and 104 can be swapped in the communication sequence.

In communication 106, during a device discovery phase, device 102 can broadcast inquiry messages to other devices operating within its communicating range. Device 102 does not at this point know the identities of these other devices, and does not address the inquiry messages to any specific device at this time.

Device 104 can be a device that is listening for inquiry messages and that is within the communicating range of device 102. Device 104 can receive an inquiry message. In communication 108, device 104 can responsively transmit device discovery information including a device address of device 102, a clock setting of device 102, a class of device 102, a page scan mode used by device 102, and a name of device 102.

Device 102 can receive the device discovery information from device 104. In communication 110, during a connection phase, device 102 can responsively transmit multiple identification packets containing the device address of device 104.

Device 104 can receive at least one of these identification packets. Device 104 can recognize its own identifier within. In communication 112, device 104 can responsively transmit a reply to the identification packet.

Device 102 can receive the reply. In communication 114, device 102 can responsively transmit a frequency hopping synchronization (FHS) packet that contains a master Bluetooth address—in this example, the address of device 102.

Device 104 can receive the FHS packet. In communication 116, device 102 can responsively transmit a reply to the FHS packet. Device 106 can also change its hopping sequence based on the master address in the FHS packet.

Device 102 can receive the reply. Device 102 also can change its hopping sequence based on the master address. In communication 118, device 102 can responsively transmit a poll message using the new hopping sequence.

Device 104 can receive the poll message. In communication 120, device 102 can responsively transmit a null response to the poll message using the new hopping sequence. When device 102 receives this response, the connection phase is completed. Thereafter, devices 102 and 104 can transmit packets to each other over the wireless connection. Each such packet can contain the transmitting device's device access code and a payload that contains data intended for the receiving device.

Discussed below are techniques that wireless-capable devices can use in order to determine that they have grown sufficiently far apart or that they have become sufficiently close together to warrant the performance of some operation based on their new distance relationship. These techniques generally involve at least one of the devices detecting wireless signals being emanated from another of the devices.

II. Device Behavior when Devices Become Far Apart

When an accessory device and a companion device are sufficiently far apart (e.g., beyond a specified threshold distance), they might be able to detect only weak signals from each other, if they can detect any at all. Such circumstances may suggest that a person having one of the devices (e.g., the accessory device) in his immediate possession might have inadvertently and unknowingly left the other device (e.g., the companion device) behind.

Accessory and companion devices can behave in a specialized manner in response to determining that they have become far apart from each other. This determination can be based on signal strength, for example, using techniques described in greater detail below.

The specialized manner in which accessory and companion devices behave when far apart from each other can vary. Discussed below are techniques for detecting that a wireless leash has been broken, for determining which device has probably been left behind, for verifying that the apparent wireless leash breakage is not due to some other circumstance (e.g., temporary signal blockage), and for helping to recover a device that has been lost.

A. Determining that the Wireless Leash has been Broken

Figure 2:
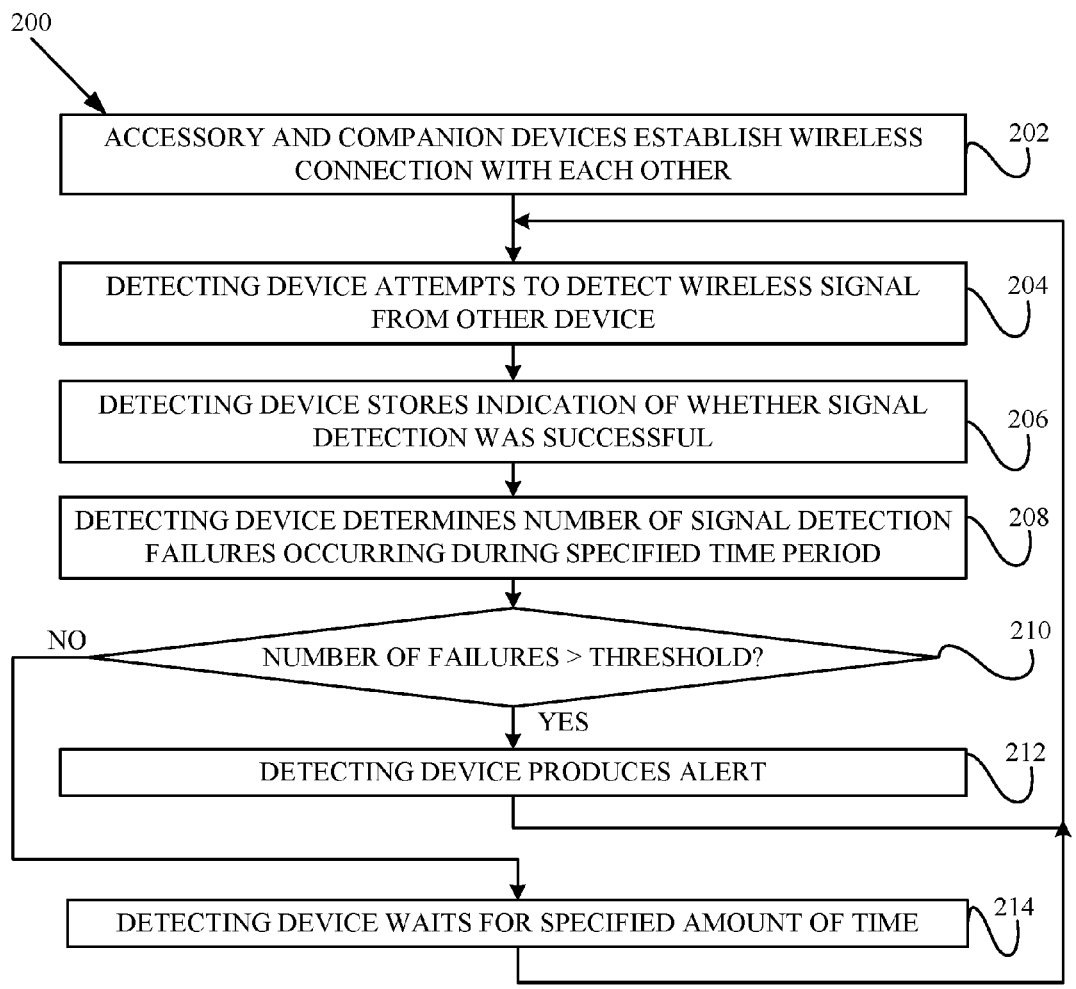
FIG. 2 is a flow diagram that illustrates an example of a technique for detecting that a wireless leash between a companion device and an accessory device has been broken, according to some embodiments.

FIG. 2 is a flow diagram that illustrates an example 200 of a technique for detecting that a wireless leash between a companion device and an accessory device has been broken, according to some embodiments. Although the example technique involves operations being performed in a specific order, variants of the technique according to some embodiments can involve these or different operations being performed in different orders.

In block 202, an accessory device and a companion device establish a wireless connection with each other. For example, the accessory device might be an Apple iPod Shuffle or other wearable device that is worn or otherwise affixed, even temporarily, to its owner's clothing or body, and the companion device might be an Apple iPhone that is carried, but not worn or otherwise affixed, to its owner. Both devices can be mobile devices. The wireless connection can be a Bluetooth connection, for example.

Following the Bluetooth protocol, either device can initiate a pairing with the other device; a user can place one device in a discoverable mode, while the other device can attempt to discover the device placed in the discoverable mode. Typically, when one device has discovered the other device, the discovering device will display a code that its user can then input into the discovered device. Successful entry of the code pairs the devices and establishes the wireless leash between the devices.

In block 204, a detecting one of the devices—either the accessory or the companion device—attempts to detect a wireless signal emanating from the other of the devices. For example, the accessory device can attempt to detect a Bluetooth signal emanating from the companion device. If the accessory device is within range of the companion device, then the accessory device is likely to detect this signal. Otherwise, the accessory device is likely to fail to detect this signal. The detecting device can periodically attempt to detect the signal at different moments in time. The detecting device can make these periodic attempts at a specified frequency.

In block 206, the detecting device stores, in a buffer, an indication of whether the detecting signal successfully detected the wireless signal from the other device. The buffer can be a cyclical buffer, or ring buffer, that is stored in the memory of the detecting device. The buffer can include multiple entries. Separate entries in the buffer can store information pertaining to separate signal detection attempts that the detecting device made at different moments in time.

Within each entry, the detecting device can insert a timestamp at which a corresponding signal detection attempt occurred. Within each entry, the detecting device also can specify either a successful detection of the signal during the corresponding attempt or a failure to detect the signal during the corresponding attempt. When the last entry of the buffer has been written, the detecting device can begin writing entries at the beginning of the buffer, potentially overwriting the oldest information within the buffer.

For example, the detecting device might attempt to detect a signal from the other device at a first moment in time. If the detecting device fails to detect that signal, then the detecting device can store, in a buffer entry specifying a timestamp representing the first moment, information that indicates that the attempt failed. Later, the detecting device might again attempt to detect a signal from the other device at a second moment in time. If the detecting device again fails to detect that signal, then the detecting device can store, in another buffer entry specifying a timestamp representing the second moment, information that indicates that the attempt failed.

In block 208, the detecting device determines a number of times that attempts to detect a signal from the other device failed during a specified time period. The specified time period can extend from some specified moment in the past up to the present moment in time. The detecting device can make this determination by examining each of the buffer entries that contains a timestamp that falls within the specified time period. The detecting device can tally the number of these entries that indicate a failed attempt to detect the signal from the other device.

Potentially, individual ones of these entries might contain false negative or false positive data. If the detecting device is at the very limit of the other device's signal broadcasting range, then it is possible that the detecting device might very temporarily pass outside of the range before quickly re-entering that range. Similarly, if a line of sight between the devices becomes temporarily obstructed, then a few outlying entries might indicate a signal detection failure even though their neighboring entries each indicate successful signal detection.

However, data gleaned from multiple entries is more likely to reflect actual circumstances. Multiple failure-indicating entries all occurring within a relatively short period of time tend to indicate, fairly reliably, that the detecting device has gone out of range of the other device for more than an insignificant amount of time.

In block 210, the detecting device determines whether the number of times determined in block 208 exceeds a specified threshold. If the number of times exceeds the specified threshold, then the detecting device produces an alert in block 212. Otherwise, the detecting device waits for a specified amount of time in block 214.

In block 212, in response to determining that the number of times determined in block 208 exceeds the specified threshold, the detecting device produces an alert. For example, an accessory device worn by the devices' owner can visibly flash a message on the accessory device's display. The message can verbally specify that the wireless leash to the companion device has been broken. For another example, such an accessory device can additionally or alternatively emit an audible distinctive sound that indicates that the wireless leash to the companion device has been broken. The sound can be a recorded, vocalized warning that the companion device is undetectable, for example, or a siren, for another example.

Either or both devices can generate the alert discussed in connection with block 212. In addition to or instead of the accessory device generating an alert, the companion device can generate an alert. This alert similarly can be visual, audible, or audiovisual. For example, an audible alert emitted by the companion device can be designed to be loud and distinctive enough that the companion device's owner is able to hear the alert even after the accessory device has passed beyond the range in which wireless signals from the companion device can be detected. Such an alert optionally can identify the device's owner—vocally by name, for example—so that the device's owner is able to ascertain that it is his companion device, and not someone else's, that is being left behind. The alert can be a sound recording that the device's owner previously recorded and stored within the companion device's memory.

In some embodiments, the alert continues or repeats for a specified amount of time and then ceases after that amount of time has expired. In some embodiments, the alert continues or repeats until the alert-producing device's operator manually instructs that device to cease producing the alert. In some embodiments, the alert continues or repeats until the detecting device once again successfully detects a wireless signal from the other device. Thus, in some embodiments, the detecting device can continue to attempt to detect a wireless signal from the other device while producing the alert.

Regardless of the mechanism through which either device is caused to cease producing the alert, afterward, the detecting device can resume periodically attempting to detect a wireless signal from the other device back in block 204.

Alternatively, in block 214, in response to determining that the number of times determined in block 208 does not exceed the specified threshold, the detecting device waits for a specified amount of time before again attempting to detect a wireless signal from the other device. The amount of time that the detecting device waits can be based on a specified frequency, for example. For example, if the specified frequency is once per eight seconds, then the detecting device can wait for eight seconds before making another attempt to detect a signal. After waiting for the specified amount of time, the detecting device again attempts to detect a signal from the other device back in block 204.

In some embodiments, in addition to storing periodically measured signal strengths in a buffer as described above, a detecting device can store data represented by those signals. Such data can include, for example, indications of whether the device from which the signal was received currently detects skin contact (discussed in greater detail below). In such embodiments, the detecting device can base its determination of whether the wireless leash was broken (and whether to generate an alert) not only upon the signal strengths stored in the buffer, but also upon the indications of whether the other device currently detects skin contact. One or more buffer entries that indicate both a relatively weak or absent signal strength in concert with a contemporary lack of detected skin contact can cause the detecting device to conclude with greater confidence that the wireless leash has been broken.

B. Skin Contact

In some embodiments, an accessory or companion device can contain a sensor that can detect whether or not a surface currently contacting that device is skin. In some embodiments, the accessory or companion device can verify that it is not currently in contact with skin before performing an operation such as generating an alert.

When a wireless leash between the devices is broken, as evidenced by successive failures of one device to detect a wireless signal from the other device, it might not always be apparent which of the devices was left behind. However, if either the companion or accessory device currently detects skin contact, then this is suggestive that the other device was the one that was separated from the owner's possession. The device that currently detects skin contact can then generate an alert that the wireless leash with the other device was broken. Because this device is likely to be in the owner's current possession, the owner is more likely to become aware of the alert.

In some embodiments, an alert is generated only by the one of the accessory and companion devices that more likely to have remained in the owner's possession. Each device can determine whether it remains in the owner's possession based on whether it can detect skin contact and based on whether it has recently engaged in any motion (as could be ascertained by that device's accelerometer, for example). If a device determines based on these and potentially other criteria that it probably is the device that is no longer in its owner's possession, then that device can refrain from generating an alert, since that alert could make nearby potential acquirers of the device aware of its loss.

Instead, that device can attempt to instruct the other device (e.g., through WiFi channels and/or over the Internet) that the other device should generate an alert. Additionally, the device that has determined that it likely no longer is in the user's possession can lock itself automatically so that its functionality is restricted from use by unauthorized people.

Figure 3:
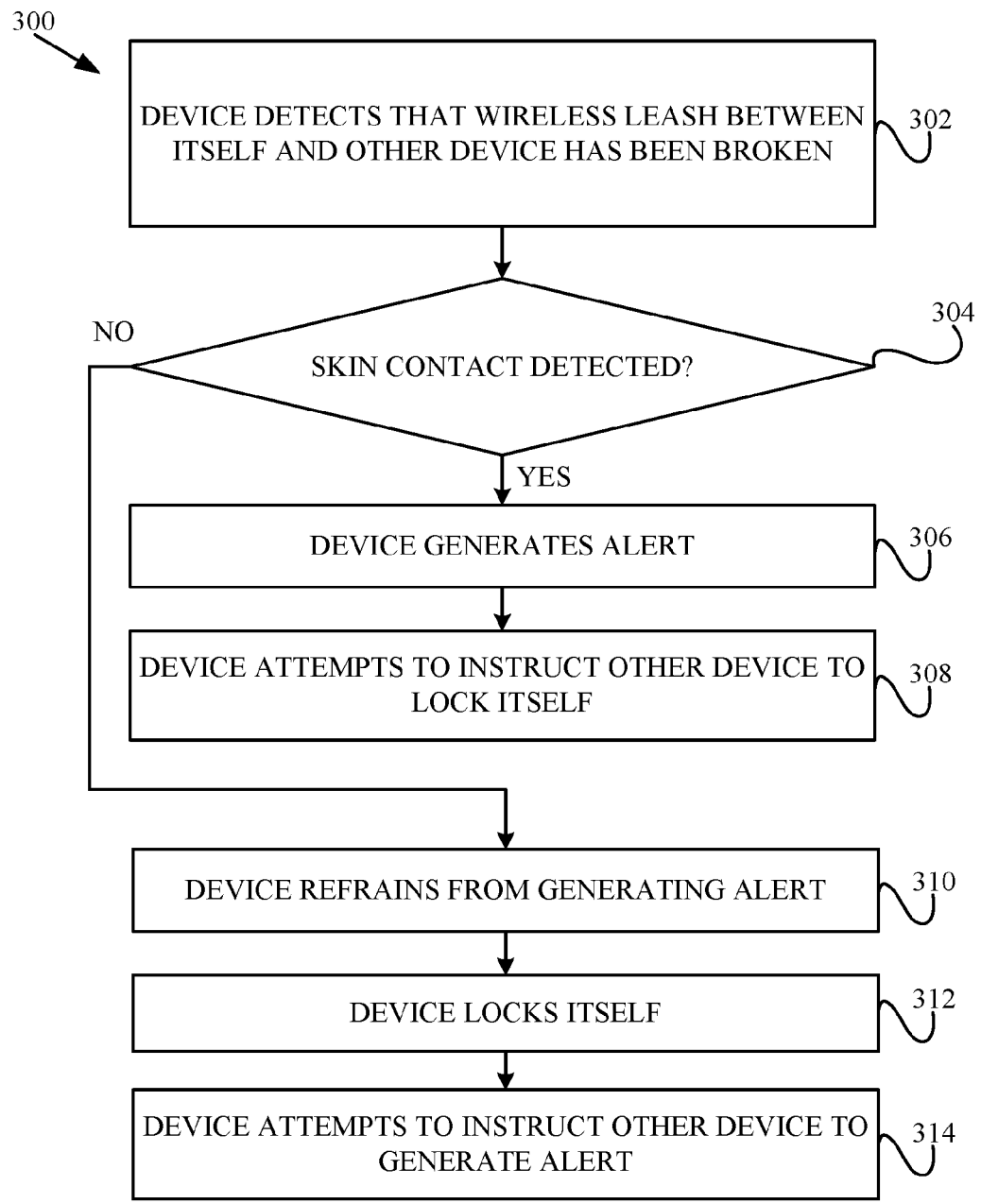
FIG. 3 is a flow diagram that illustrates an example of a technique through which a device can use the presence or absence of detected skin contact to determine whether it or another device has been separated from its owner, and to respond appropriately based on this determination, according to some embodiments.

FIG. 3 is a flow diagram that illustrates an example 300 of a technique through which a device can use the presence or absence of detected skin contact to determine whether it or another device has been separated from its owner, and to respond appropriately based on this determination, according to some embodiments. Although the example technique involves operations being performed in a specific order, variants of the technique according to some embodiments can involve these or different operations being performed in different orders.

In block 302, a device detects that a wireless leash between itself and another device has been broken. For example, a device can perform the technique discussed above in connection with FIG. 2 in order to make this determination.

In block 304, in response to detecting the wireless leash breakage, the device determines whether it senses skin contact with at least one of its surfaces. For example, the device can read one or more sensors exposed to its surface to determine this contact. Such sensors may detect electrical impulses, temperatures, humidity, pressure, pulses, textures, and/or some combination of these and other characteristics. If the device detects skin contact, then, beginning in block 306, the device can take measures appropriate when another device has become separated from its owner. Otherwise, if the device does not detect skin contact, then, beginning in block 310, the device can take measures appropriate when it is the device that has become separate from its owner.

In block 306, in response to detecting skin contact, the device generates an alert. For example, the device can display a visual alert, the device can emit an audible alert, and/or the device can produce a tactile alert (e.g., through vibration).

In block 308, the device attempts to instruct the other device, with which the wireless leash was broken, to lock itself automatically. For example, using WiFi, the device can attempt to send a message over the Internet addressed to the other device. The message can instruct the other device to lock itself automatically so as to become unusable to those not possessing recognized credentials. For another example, the device can attempt to send such a message using short messaging service (SMS) text messaging, e-mail, cellular telephony, or other communication technologies.

Alternatively, in block 310, in response to failing to detect skin contact, the device refrains from generating an alert. As is discussed above, such an alert could advertise to people other than the device's owner that the device is not in its owner's possession.

In block 312, the device automatically locks itself. For example, the device can present a user interface that accepts a credential. The device can enter a mode in which no other functionality of the device is accessible locally (but still potentially remotely) until a valid credential has been supplied through the user interface, or until the device has received an unlocking signal from the other device with which the wireless tether was broken.

In block 314, the device attempts to instruct the other device, with which the wireless leash was broken, to generate an alert. For example, using WiFi, the device can attempt to send a message over the Internet addressed to the other device. The message can instruct the other device to generate a visible, audible, and/or tactile alert so as to make the possessor of the other device aware of the tether breakage. For another example, the device can attempt to send such a message using short messaging service (SMS) text messaging, e-mail, cellular telephony, or other communication technologies.

C. Verifying a Broken Wireless Leash Sonically

When a detecting device successively fails to detect wireless signals from another device, that can indicate to the detecting device that the wireless leash (tether), between the devices has been broken. However, it is possible that the failure to detect the wireless signal is due to some physical obstruction rather than excessive distance between the devices.

In some embodiments, in order to verify that accessory and companion devices truly are no longer within each other's vicinities, upon either device detecting that the wireless leash has been broken, that device begins to emit a high-frequency sound from its speakers with a distinctive rhythm or pattern. The sound can be produced at a frequency sufficiently high that human ears are incapable of hearing it.

Using built-in microphones, each of the devices can periodically listen for the distinctive sounds from the other device. If either device detects the sounds from the other device, then this indicates that the devices remain in the vicinity of each other, and that the breaking of the wireless leash was not due to the devices going out of range of each other. Under such circumstances, the detecting device can continue to attempt to detect a wireless signal from the other device instead of generating an alert.

Alternatively, if some specified period of time passes after the detecting of the breaking of the wireless leash without either device hearing the distinctive sounds from the other device, then this verifies that the wireless leash truly was broken. Under such circumstances, one or both devices can generate an alert as discussed above.

D. Remembering the Last Known Location

As is discussed above, a companion device and an accessory device can wirelessly exchange information indicating their current estimated geographical coordinates under some circumstances. Furthermore, these devices can detect that a wireless leash between them has broken. In some embodiments, each device can store, in its memory, the last known geographical coordinates that it received from the other device. After one device detects that its wireless leash with the other device has broken, the former device can display the last known location of the latter device in order to help its user locate the latter device. The devices additionally or alternatively can use the last known location of the other device in attempting to re-establish a wireless leash with the other device.

In some embodiments, an accessory or companion device can use the strength of the wireless signal last received from the other device prior to the breaking of the wireless leash in order to estimate a radius of a circular region in which the other device might be located. Such a circular region can be centered on the last known geographical coordinates of the other device. For example, if the wireless signal last received from the other device prior to the breaking of the wireless leash was relatively strong, then the radius of the circular region can be relatively small. In contrast, if the wireless signal last received from the other device prior to the breaking of the wireless leash was relatively weak, then the radius of the circular region can be relatively large.

III. Device Behavior when Devices Become Close Together

When an accessory device and a companion device are sufficiently close together (e.g., within a specified threshold distance), the resulting reliability of their wireless connection to each other can enable them to perform activities that they might avoid performing from greater distances. When a wireless connection between the devices is sufficiently reliable, data can be transmitted over that connection with greater speed, making the transmission of larger quantities of data between the devices feasible.

Accessory and companion devices can behave in a specialized manner in response to determining that they are close to each other. This determination can be based on signal strength, for example, using techniques described in greater detail below.

The specialized manner in which accessory and companion devices behave when close to each other can vary. Different techniques that one device can use to facilitate the control of another device when sufficiently close are also described in greater detail below.

A. Determining the Closeness of Devices

Disclosed herein are different techniques for determining when devices are close. One such technique involves one device changing the frequency at which it listens for signals emanating from the other device based on changes in the detected strengths of those signals. Another such technique involves determining locations of the devices based on WiFi access points, and then estimating the distance between those locations. Yet another technique involves determining a particular device's location based on familiar signals from other devices that the particular device has historically detected and associated with that location. These techniques are discussed below.

1. Varying Detection Frequency Based on Device Proximity

As is discussed above, wirelessly tethered (leashed), devices can perform specified operations in response to determining that the wireless leash between those devices has been broken due to the devices passing out of signal broadcasting range of each other. In some embodiments, these devices additionally or alternatively can perform specified operations in response to determining that they have come close together. Based on the strength of the signal that a detecting device periodically detects from the other device, the detecting device can estimate its distance from the other device.

A relatively strong signal indicates a relatively short distance, while a relatively weak signal indicates a relatively long distance. When the estimated distance becomes less than a specified threshold, or when the detected signal strength becomes greater than a specified threshold, one or both devices can perform specified operations. For example, when the devices are sufficiently close to each other, the devices can commence the wireless transmission of data over a Bluetooth connection.

Battery life is often a concern when operating a mobile device such as a companion or accessory device. The generation and detection of wireless signals can significantly drain a mobile device's battery. Therefore, it is often desirable to minimize the proportion of time that a mobile device spends generating and/or attempting to detect wireless signals.

In some embodiments, companion and accessory devices can enter different and distinct modes of operation in which those devices generate and/or attempt to detect wireless signals at various different frequencies. For example, while a device is in a first mode of operation, the device can generate and attempt to detect wireless signals at a first frequency (e.g., once per eight seconds), but while that device is in a second mode of operation, the device can generate and attempt to detect wireless signals at a second, greater frequency (e.g., ten times per second).

The devices can transition from one such mode of operation to another such mode of operation in response to either or both devices detecting that they have come within, or passed without, a specified estimated distance of each other. Essentially, the devices can transition between such modes of operation in response to either or both devices detecting that the strength of a wireless signal detected from the other device either exceeds or falls below a specified threshold.

For example, while the devices are relatively far away from each other, detecting weaker signals, the devices can generate and attempt to detect wireless signals at a lower frequency, but while the devices are relatively close to each other, detecting stronger signals, the devices can generate and detect wireless signals at a higher frequency. Although generating and attempting to detect wireless signals at a higher frequency tends to consume battery life at a higher rate, more frequent wireless activity may justify this higher battery consumption when the devices become close enough to each other that certain operations, such as wireless data transfer, become feasible.

In order to perform wireless data transfer between accessory and companion devices feasibly—such as the wireless transfer of image or music data, for example—the devices typically should be relatively close together. Thus, the devices can periodically attempt to estimate their distances from each other by detecting wireless signals from each other.

In order to conserve battery life, the devices can make these attempts at a relatively low frequency until the devices estimate—based on previously detected signal strengths—that they might actually have come within a distance of each other at which wireless data transfer is feasible. Upon making such an estimation, the devices can commence making the attempts at a relatively high frequency in order to verify that they actually are within a distance of each other at which wireless data transfer is feasible.

Figure 4:
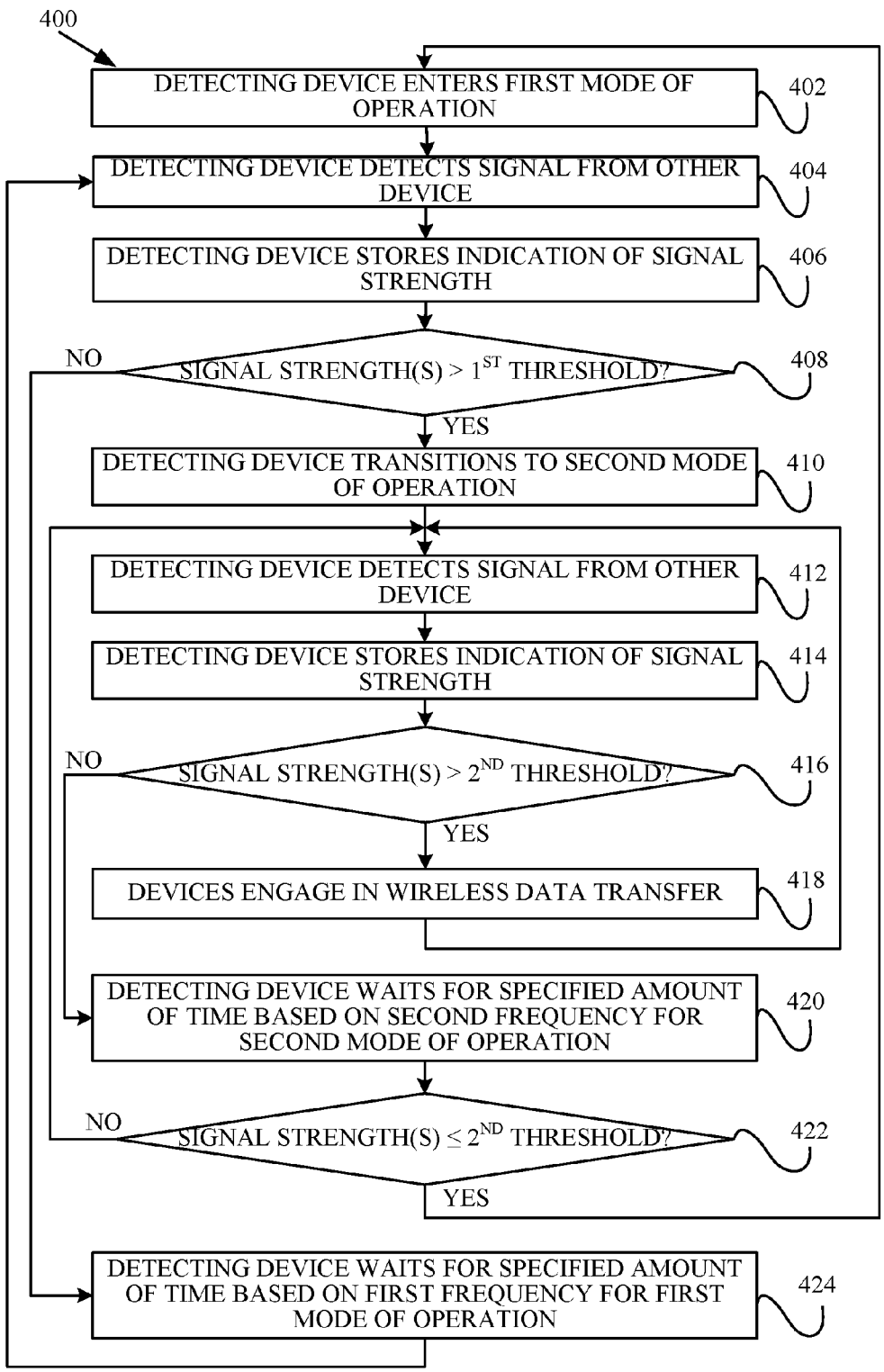
FIG. 4 is a flow diagram that illustrates an example of a technique for varying the frequency with which an accessory or companion device attempts to detect a signal from the other device based on strengths of signals that the detecting device has detected from the other device, according to some embodiments.

FIG. 4 is a flow diagram that illustrates an example 400 of a technique for varying the frequency with which an accessory or companion device attempts to detect a signal from the other device based on strengths of signals that the detecting device has detected from the other device, according to some embodiments. Although the example technique involves operations being performed in a specific order, variants of the technique according to some embodiments can involve these or different operations being performed in different orders.

In block 402, a detecting device enters a first mode of operation in which the detecting device attempts to detect wireless signals (e.g., Bluetooth signals) from another device at a first, relatively low, frequency (e.g., once per eight seconds).

In block 404, the detecting device detects a wireless signal produced by the other device. The wireless signal is characterized by a signal strength (e.g., measured in decibels). The signal strength can be measured in a manner known to one skilled in the art.

In block 406, the detecting device stores, in an in-memory buffer, an indication of the strength of the signal detected in block 404. As in the discussion above, the buffer can be a cyclical buffer, or ring buffer, that is stored in the memory of the detecting device. The buffer can include multiple entries. Separate entries in the buffer similarly can store information pertaining to separate signals that the detecting device detected at different moments in time.

As in the discussion above, within each entry, the detecting device can insert a timestamp at which a corresponding signal was detected. Within each entry, the detecting device can specify the strength (e.g., in decibels) of the corresponding detected signal. As in the discussion above, when the last entry of the buffer has been written, the detecting device can begin writing entries at the beginning of the buffer, potentially overwriting the oldest information within the buffer.

In block 408, the detecting device determines whether one or more signal strengths stored in the buffer each exceeds a first specified threshold. For example, the detecting device can examine the X most recent entries, where X is a specified quantity. If each of those entries contains a signal strength that exceeds the first specified threshold, then the detecting device can determine that it should transition from the first mode of operation to a second mode of operation, discussed below.

For another example, the detecting device can examine the Y most recent entries, where Y is a specified quantity greater than X discussed above. If at least X of those entries contains a signal strength that exceeds the first specified threshold, then the detecting device can determine that it should transition from the first mode of operation to a second mode of operation, discussed below.

Regardless of which of a variety of approaches is used, if the detecting device determines that the one or more signal strengths stored in the buffer each exceeds the first specified threshold, then the device transitions from the first mode of operation to the second mode of operation in block 410. Otherwise, the detecting device waits for a specified amount of time in block 424.

In block 410, in response to determining in block 408 that the one or more signal strengths stored in the buffer each exceeds the first specified threshold, the detecting device transitions from the first mode of operation to a second mode of operation in which the detecting device attempts to detect wireless signals (e.g., Bluetooth signals) from another device at a second, relatively high, frequency (e.g., ten times per second).

In some embodiments, other events additionally or alternatively can trigger the detecting device to transition from the first mode of operation to the second mode of operation. For example, if the formerly locked other device becomes unlocked (e.g., due to its user manually inputting a passcode through the locked device's user interface), then the other device can send, to the detecting device, a wireless signal indicating that the other device has become unlocked. Such an event may be indicative that the wearer of the accessory device is close enough to contact the companion device physically, for example. In response to receiving such a signal, the detecting device can transition from the first mode of operation to the second mode of operation.

In block 412, the detecting device detects a wireless signal produced by the other device. The wireless signal is characterized by a signal strength (e.g., measured in decibels).

In block 414, the detecting device stores, in the in-memory buffer, an indication of the strength of the signal detected in block 414.

In block 416, the detecting device determines whether one or more signal strengths stored in the buffer each exceeds a second specified threshold. For example, the detecting device can examine the X most recent entries, where X is a specified quantity. If each of those entries contains a signal strength that exceeds the second specified threshold, then the detecting device can determine that it should commence wirelessly transferring data with the other device, as is discussed below.

For another example, the detecting device can examine the Y most recent entries, where Y is a specified quantity greater than X discussed above. If at least X of those entries contains a signal strength that exceeds the second specified threshold, then the detecting device can determine that it should commence wirelessly transferring data with the other device, as is discussed below.

Regardless of which of a variety of approaches is used, if the detecting device determines that the one or more signals strengths stored in the buffer each exceeds the second specified threshold, then the device commences wirelessly transferring (e.g., sending, receiving, or sending and receiving) data with the other device in block 418. Otherwise, the detecting device waits for a specified amount of time in block 420.

In block 418, in response to determining in block 416 that the one or more signal strengths stored in the buffer each exceeds the second specified threshold, the detecting device commences wirelessly transferring (e.g., sending, receiving, or sending and receiving) data with the other device. For example, the accessory device and the companion device can synchronize, with each other, the music, photo, application, and/or video data that each stores within their memories. The wireless transfer can be performed over the Bluetooth connection between the devices, for example.

Although in some embodiments the accessory device and the companion device can commence wireless data transfer as soon as the signal strengths in the buffer consistently exceed the second specified threshold, in some embodiments the accessory and companion devices can first use their Bluetooth connection in order to exchange their estimated geographical coordinates with each other. In such embodiments, the accessory and companion devices can commence wireless data transfer (or some other automatic operation) upon verifying, based on the exchanged geographical coordinates, that the accessory and companion devices actually are within a specified distance of each other.

As a result of the synchronization, the sets of data (or user-selected subsets of data) stored on each of the devices can become duplicates of each other. Following the conclusion of the wireless data transfer session, the detecting device can resume operating in the second mode of operation back in block 412.

Alternatively, in block 420, in response to determining in block 416 that at least one of the one or more signal strengths stored in the buffer does not exceed the second specified threshold, the detecting device waits for a specified amount of time before again detecting a wireless signal from the other device. Because the detecting device is in the second mode of operation, the amount of time that the detecting device waits can be based on the second, relatively high, frequency. For example, if the second frequency is ten times per second, then the detecting device can wait for a tenth of a second before making another attempt to detect a signal.

Under some circumstances, the detecting device can transition from the second mode of operation back into the first mode of operations. In block 422, the detecting device determines whether each of the one or more signal strengths stored in the buffer fails to exceed the second specified threshold. For example, the detecting device can examine the X most recent entries, where X is a specified quantity. If each of those entries contains a signal strength that does not exceed the second specified threshold, then the detecting device can determine that it should transition from the second mode of operation back to the first mode of operation.

For another example, the detecting device can examine the Y most recent entries, where Y is a specified quantity greater than X discussed above. If at least X of those entries contains signal strength that does not exceed the second specified threshold, then the detecting device can determine that it should transition from the second mode of operation back to the first mode of operation.

Regardless of which of a variety of approaches is used, if the detecting device determines that the one or more signals strengths stored in the buffer each fails to exceeds the second specified threshold, then the device transitions from the second mode of operation back to the first mode of operation back in block 402. Otherwise, the detecting device again attempts to detect a signal from the other device back in block 412.

Alternatively, in block 424, in response to determining in block 408 that at least one of the one or more signal strengths stored in the buffer does not exceed the first specified threshold, the detecting device waits for a specified amount of time before again detecting a wireless signal from the other device. Because the detecting device is in the first mode of operation, the amount of time that the detecting device waits can be based on the first, relatively low, frequency. For example, if the first frequency is once per eight seconds, then the detecting device can wait for eight seconds before making another attempt to detect a signal. After waiting for the specified amount of time, the detecting device again attempts to detect a signal from the other device back in block 404.

2. Estimating Proximity Using WiFi

As is discussed above, in some embodiments, companion and accessory devices can estimate their distances from each other based on strengths of wireless signals (e.g., Bluetooth signals) that they periodically detect emanating from the other device. However, the devices additionally or alternatively can use other techniques for estimating their distances from each other. Some techniques for estimating distance use WiFi technology.

A wireless router or access point can be configured to store information that indicates its geographical location. Accessory and companion devices can connect wirelessly with these wireless routers or access points. Accessory and companion devices can query the wireless routers or access points with which they have wirelessly connected in order to obtain the information that indicates geographical location. The accessory and companion devices can use the geographical locations of the wireless routers or access points as rough estimates of their own geographical locations.

After an accessory device and a companion device have estimated their geographical locations in this manner, the devices can communicate over a WiFi-accessible network in order to inform each other of their estimated geographical locations. Using digital maps that can be locally stored on the devices or accessed through a WiFi-accessible network, the devices can estimate the distance between their geographical locations.

The devices can use the estimated distance in order to determine whether to attempt to establish a Bluetooth connection with each other. If the estimated distance is below a specified threshold distance, then the devices can activate their Bluetooth functionality and begin to transmit and attempt to detect Bluetooth signals that could not be detected over longer distances.

Figure 5:
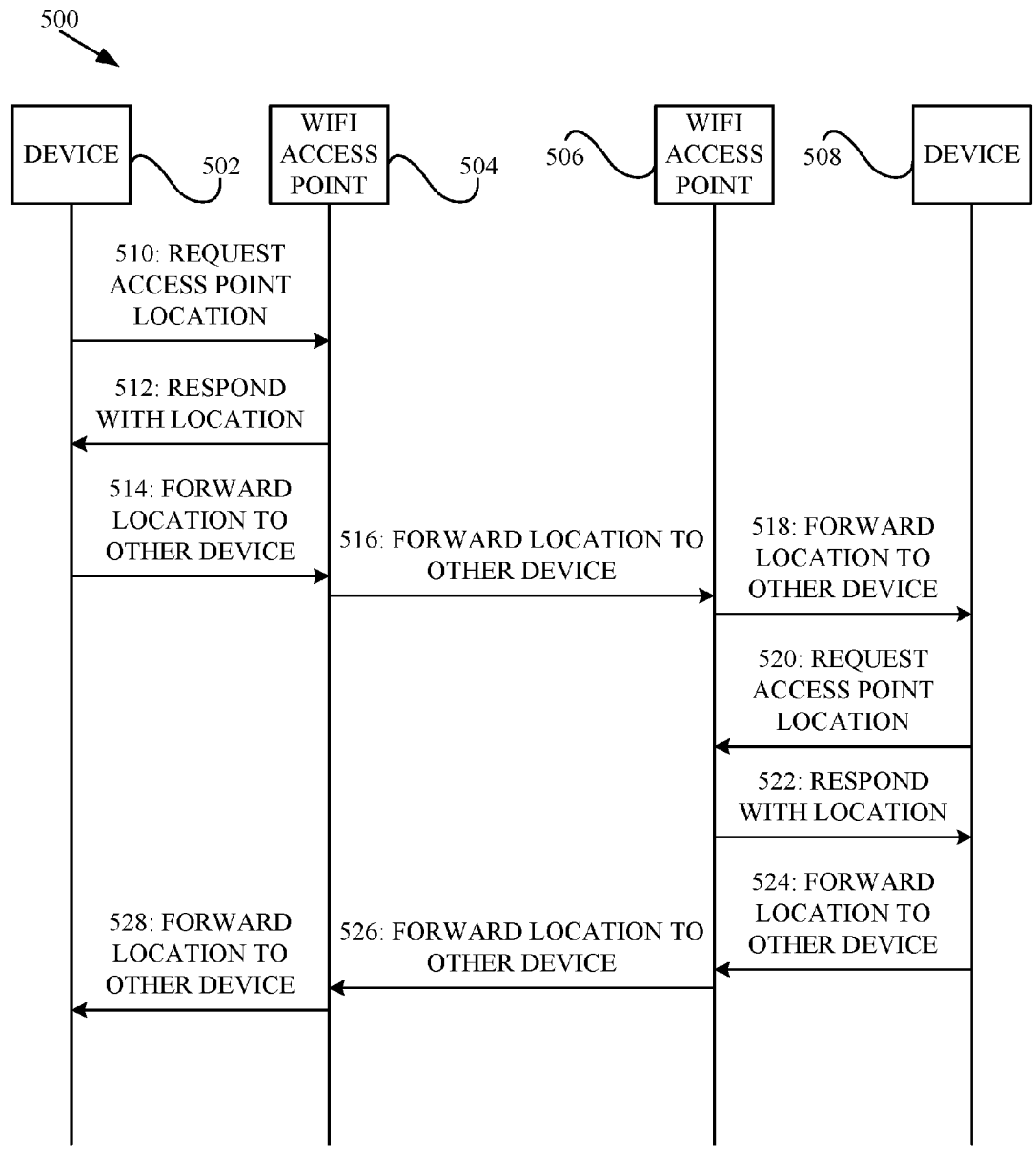
FIG. 5 is a signal flow diagram that illustrates an example of a pair of devices determining their own locations based on the locations of the WiFi access points to which they are wirelessly connected, and then forwarding their locations to the other device in the pair, according to some embodiments.

FIG. 5 is a signal flow diagram that illustrates an example 500 of a pair of devices determining their own locations based on the locations of the WiFi access points to which they are wirelessly connected, and then forwarding their locations to the other device in the pair, according to some embodiments. Device 502 can be a companion device such as a smart phone, for example. Device 508 can be a wearable accessory device such as a portable music player, for example.

WiFi access points 504 and 506 each can communicate wirelessly with devices 502 and 508, respectively, using WiFi technology. WiFi access points 504 and 506 also can communicate with each other over the Internet. Although different communications discussed below are attributed to different ones of devices 502 and 504, the roles of devices 502 and 504 can be swapped in the communication sequence.

In communication 510, device 502 can request, from WiFi access point 504, a geographical location of WiFi access point 504. In response to receiving communication 510, in communication 512, WiFi access point 504 can send, to device 502, the geographical location of WiFi access point 504.

In response to receiving communication 512, in communication 514, device 502 can forward, through WiFi access point 504, the geographical location that device 502 received from WiFi access point 504. The forwarded message can be destined for device 508.

In response to receiving communication 514, in communication 516, WiFi access point 504 can forward, over the Internet, to WiFi access point 506, the geographical location that device 502 received from WiFi access point 504. Again, the forwarded message can be destined for device 508.

In response to receiving communication 516, in communication 518, WiFi access point 506 can forward, to device 508, the geographical location that device 502 received from WiFi access point 504. As a result, device 508 obtains the estimated geographical location of device 502.

In response to receiving communication 518, in communication 520, device 508 can request, from WiFi access point 506, a geographical location of WiFi access point 506. In response to receiving communication 520, in communication 522, WiFi access point 506 can send, to device 508, the geographical location of WiFi access point 506.

At this point, device 508 has obtained both its own estimated geographical location as well as the estimated geographical location of device 502. Consequently, device 508 can estimate the distance between the estimated geographical locations using a stored map.

In response to receiving communication 522, in communication 524, device 508 can forward, through WiFi access point 506, the geographical location that device 508 received from WiFi access point 506. The forwarded message can be destined for device 502.

In response to receiving communication 524, in communication 526, WiFi access point 506 can forward, over the Internet, to WiFi access point 504, the geographical location that device 508 received from WiFi access point 506. Again, the forwarded message can be destined for device 502.

In response to receiving communication 526, in communication 528, WiFi access point 504 can forward, to device 502, the geographical location that device 508 received from WiFi access point 506. As a result, device 502 obtains the estimated geographical location of device 508.

At this point, device 502 also has obtained both its own estimated geographical location as well as the estimated geographical location of device 508. Consequently, device 502 also can estimate the distance between the estimated geographical locations using a stored map.

As is discussed above, devices 502 and 508 each can then use the estimated distance in order to determine whether to attempt to establish a Bluetooth connection with each other.

3. Estimating Location Using Bluetooth Pairing History

In some embodiments, accessory and companion devices maintain, in their memories, histories of the devices with which they paired using the Bluetooth protocol. An accessory or companion device can estimate its current location at the time that it paired with another device or set of other devices. For example, an accessory or companion device can use GPS or WiFi techniques in order to estimate its current geographical location. Then accessory or companion device can then store, in its memory, a mapping between that geographical location and the other device or set of devices with which it was paired at that location.

At other times, in which the accessory or companion device is unable to ascertain its geographical location using other techniques such as GPS or WiFi, the accessory or companion device can compare the set of other devices with which it is currently paired (e.g., using Bluetooth) to the paired device-to-location mappings stored in its memory. If a mapping stored in its memory specifies the same set of paired devices as the set of devices with which the accessory or companion device is currently paired, then the accessory or companion device can estimate that it is currently located at the geographical location that is mapped to that set of paired devices.

Additionally or alternatively, the accessory or companion device can use such mappings to verify that its geographical location estimated using other techniques (e.g., GPS, WiFi, etc.) is correct. For example, if an accessory or companion device previously paired with a Bluetooth-equipped toaster and coffee maker at a particular geographical location, and if the accessory or companion device currently estimates using other techniques that it is at the particular geographical location, then the accessory or companion device can verify based on its current Bluetooth pairing with the same toaster and coffee maker that it actually is at the particular geographical location.

Upon estimating its current location using the paired device-to-location mappings, an accessory or companion device can use that location in the various techniques discussed herein. For example, the accessory or companion device can use such a determined location to generate an alert if another device is being left behind. For another example, the accessory or companion device can use such a determined location to automatically unlock another device and/or commence an automatic wireless data transfer with another device that is sufficiently close to that determined location.

Figure 6:
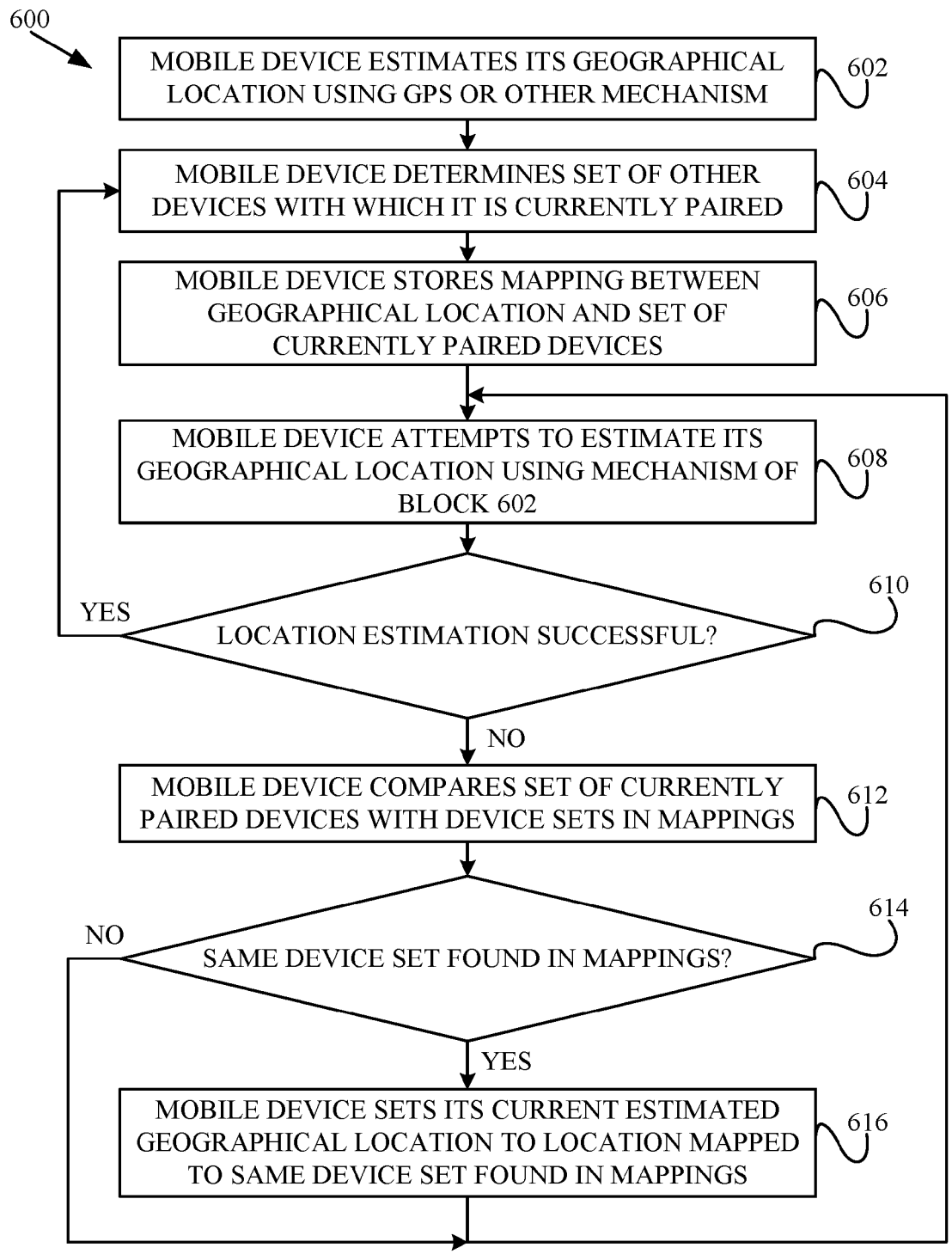
FIG. 6 is a flow diagram that illustrates an example of a technique through which a device can use historical paired device-to-location mappings in order to estimate its current geographical location, according to some embodiments.

FIG. 6 is a flow diagram that illustrates an example 600 of a technique through which a device can use historical paired device-to-location mappings in order to estimate its current geographical location, according to some embodiments. Although the example technique involves operations being performed in a specific order, variants of the technique according to some embodiments can involve these or different operations being performed in different orders.

In block 602, a mobile device estimates its current geographical location using a global positioning system (GPS).

In some embodiment, the mobile device can use additional or alternative techniques to determine its current geographical location. Some of these techniques can involve the detection of WiFi or other radio signatures, for example.

In block 604, the mobile device determines a set of other devices with which it is currently Bluetooth paired. For example, the mobile device might determine that it currently so paired with both a television and a thermostat.

In block 606, the mobile device stores, in its memory, a mapping between the current geographical location and the set of other devices with which it is currently paired. In some embodiments, if a mapping for the current geographical location already exists in the mobile device's memory, then the mobile device can responsively update the mapping with the most recently acquired pairing information.

In block 608, potentially after the mobile device has moved and potentially after some amount of time has passed, the mobile device attempts to estimate its current geographical location using the same mechanism that it used in block 602 (e.g., GPS). For example, the mobile device can make this attempt after ten seconds have passed since the last location determination, or after detecting a difference in the set of other devices with which the mobile device is currently paired.

In block 610, the mobile device determines whether it was able to estimate its current geographical location in block 608. For various reasons, the mobile device might not have succeeded in its attempt. For example, if the mobile device has moved to an indoor location with poor visibility to the sky, then GPS-based location estimation techniques might temporarily become ineffective.

If the device was able to estimate its current geographical location, then the mobile device again initiates the process of updating its mappings back in block 604. Alternatively, if the device was unable to estimate its current geographical location, then the mobile device initiates the process of using its stored history of mappings to estimate its current geographical location in block 612.

In block 612, in response to a failure to estimate its current geographical location, the mobile device compares the set of other devices with which it is currently Bluetooth paired to the sets of devices in its stored history of mappings. For example, the stored history can include multiple mappings, each with a different set of paired devices. The mobile device can attempt to locate a particular mapping with the same (or, in some embodiments, a similar) set of devices to the set of devices with which the mobile device is currently paired.

In block 614, the mobile device determines whether it found, in its stored history of mappings, a particular mapping with the same (or, in some embodiments, a similar) set of devices to the set of devices with which the mobile device is currently paired. If so, then the mobile device can proceed to set its current estimated geographical location based on the particular mapping in block 616. Otherwise, the mobile device can again attempt to use a GPS or other mechanisms to estimate its current geographical location back in block 608.

In block 616, in response to finding, in its stored history of mappings, a particular mapping with the same (or, in some embodiments, a similar) set of devices to the set of devices with which the mobile device is currently paired, the mobile device sets its current estimated geographical location that is contained in the particular mapping. The mobile device can later attempt, again, to use GPS or other mechanisms to estimate its geographical location back in block 608.

In some embodiments discussed above, a companion or accessory device can compare the sets of devices from which it can currently detect signals to sets of devices from which it historically detected signals. The device can do this in order to estimate the current location of the companion or accessory device. However, some other devices from which a companion or accessory device can detect signals might also be mobile in nature, and therefore less useful for purposes of determining a companion or accessory device's current location.

Therefore, in some embodiments, a companion or accessory device can filter out a subset of other devices from which it has historically detected wireless signals, or with which it has historically paired, when attempting to estimate its current location. For each other device from which the accessory or companion device detects a signal, and/or for each other device with which the accessory or companion device wirelessly pairs, the accessory or companion device can store, in its memory, a mapping between that other device's identity and the accessory or companion device's estimated location at the time of detection or pairing. The location can be estimated using a variety of techniques discussed herein (e.g., GPS, WiFi, etc.).

For each other device with which the accessory or companion device has previously detected a signal or from which the accessory or companion device has previously wireless paired, the accessory or companion device can examine the location(s) to which that other device is mapped. If the locations are not within a specified distance of each other, then the accessory or companion device can conclude that the other device is, itself, mobile, and therefore an unreliable anchor for ascertaining the accessory or companion device's current location. The accessory or companion device can responsively add an identity of that other device to a list of devices that are to be excluded from use in estimating the accessory or companion device's current location according to some of the techniques discussed above.

B. Actions Performed by Close Devices

As is discussed above, the actions that devices can perform when those devices are determined to be sufficiently close to each other can vary. One example discussed below involves one device automatically and remotely unlocking the other device so that a user of that other device does not need to bother entering a passcode into that other device to unlock that device manually. Another example discussed below involves a device selecting, from a set of user interfaces, a particular user interface to present when the device estimates that it is closest to another device for which that particular user interface is appropriate.

1. Automatically Unlocking a Nearby Device

As is discussed above, in some embodiments, a companion device and an accessory device can commence transferring or synchronizing data wirelessly upon determining that the strengths of the signals that at least one can detect from the other are consistently stronger than a specified threshold. In some embodiments, upon making such a determination, the companion device and the accessory device can perform additional or alternative operations. For example, the accessory device can unlock the companion device, or vice-versa, upon determining that the strengths of the signals that at least one can detect from the other are consistently stronger than a specified threshold.

Referring again to FIG. 4, and more specifically block 418, instead of or in addition to commencing wireless data transfer, the accessory device can unlock the companion device and/or the companion device can unlock the accessory device. Often, a device will have a feature wherein the device will restrict its own operability after being switched on or after the passage of some specified amount of time during which the device has not received any user input. While the device's operability is restricted in this manner, the device is said to be locked. Usually, at least a subset of the applications stored on the device are not accessible to a user while the device remains locked. Typically, the device will unlock itself, and unrestrict its operability, in response to receiving (e.g., through a touch-sensitive display) user input that specifies a device-recognized passcode.

Repeatedly entering such a passcode in order to unlock the device manually can become tiresome for a device's user. Therefore, in some embodiments, when an accessory device estimates that it is within a specified distance of a companion device with which it is wirelessly paired, the accessory device automatically transmits the passcode or some other secure signal wirelessly to the companion device. As is discussed above, an accessory device can estimate that it is within close proximity to a companion device in response to detecting consistently strong wireless signals emanating from the companion device.

In response to receiving this automatically transmitted passcode or other secure signal, the companion device can automatically unlock itself without requiring a user to enter the passcode manually. After the companion device has become unlocked, the previously inaccessible subset of applications becomes accessible to the companion device's user.

2. Selecting a User Interface Based on Comparative Signal Strengths From Other Devices An accessory or companion device can detect wireless signals concurrently from a multitude of different wireless-capable devices in its environment. For example, in a home environment, a mobile phone might detect wireless signals from both a television and a thermostat at the same time. In some embodiments, the accessory or companion device can selectively configure the user interface that it currently displays based on which of the several currently detected signals is the strongest.

For example, a mobile phone can store a first user interface that is useful for controlling a first wireless-capable device, and a second, different user interface that is useful for controlling a second wireless-capable device. While the mobile phone is concurrently detecting wireless signals from both the first wireless-capable device and the second wireless-capable device, the mobile phone can determine which wireless signal is stronger. The mobile phone can then select, for presentation on its display, the user interface that is useful for controlling the device from which the stronger wireless signal was detected.

For example, if a mobile phone detects that a wireless signal currently detected from a television is stronger than a wireless signal currently detected from a thermostat, then the mobile phone can configure itself to present a user interface that allows the mobile phone to be used as a remote control for the television (e.g., with channel and volume controls). However, if the mobile phone detects that a wireless signal currently detected from a television is weaker than a wireless signal currently detected from a thermostat, then the mobile phone can configure itself to present a user interface that allows the mobile phone to be used as a remote control for the thermostat (e.g., with a temperature control). The mobile phone or other accessory or companion device can periodically compare the relative strengths of the signals that it currently detects from other devices and may change its configuration in response to detecting a change in the relative strengths.

Figure 7:
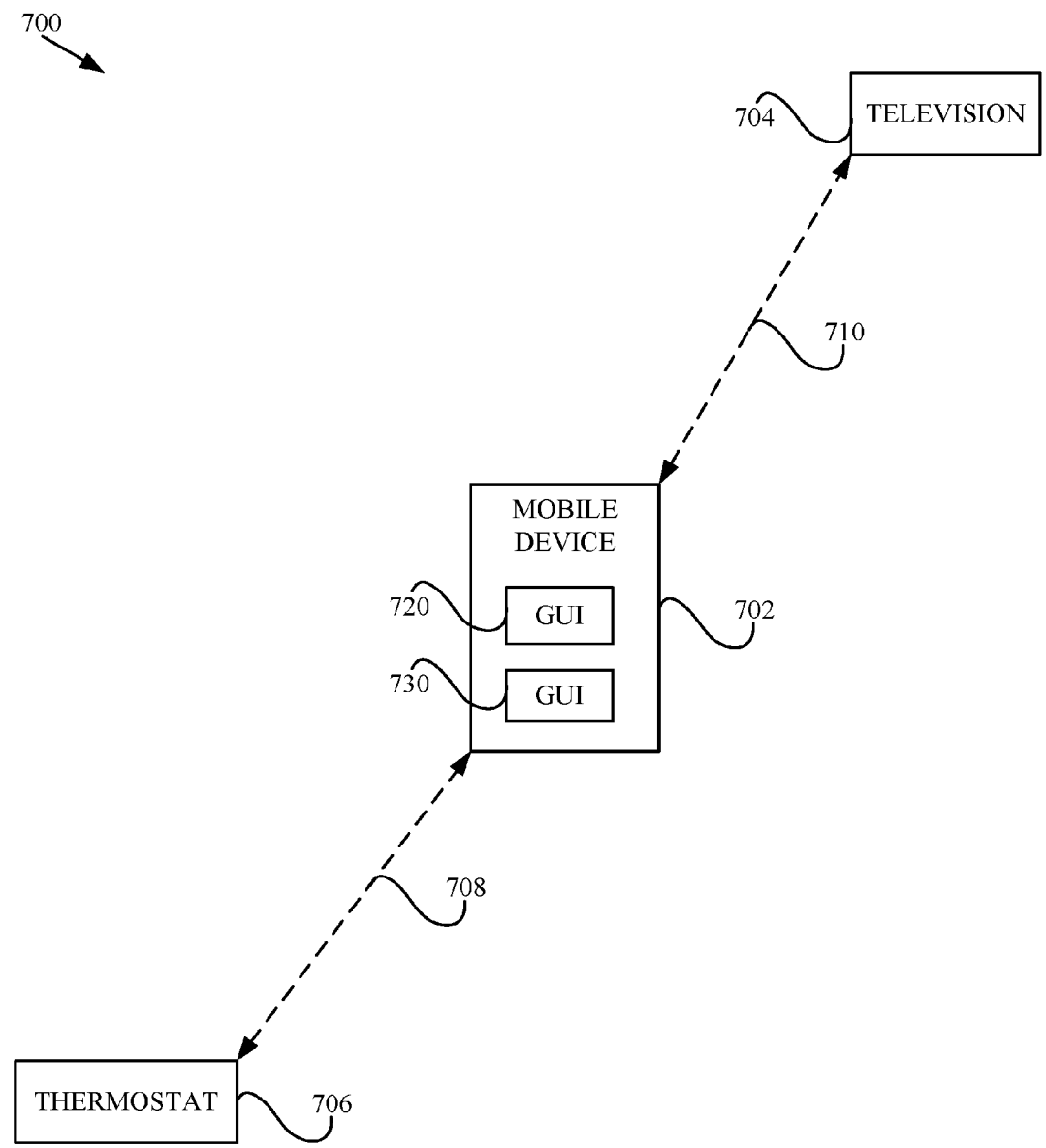
FIG. 7 is a block diagram that illustrates an example of a mobile device selecting a user interface to present based on the comparative strengths of wireless signals that it currently detects from other devices, according to some embodiments.

FIG. 7 is a block diagram that illustrates an example 700 of a mobile device selecting a user interface to present based on the comparative strengths of wireless signals that it currently detects from other devices, according to some embodiments. FIG. 7 shows a mobile device 720 that stores different graphical user interfaces (GUIs) 720 and 730. FIG. 7 also shows a television 704 and a thermostat 706.

Television 704 and thermostat 706 each can emit wireless signals, such as Bluetooth signals, that identify the sender of those signals. Mobile device 702 can detect these signals and can measure the strengths of these signals. Mobile device 702 can estimate distances between itself and each of television 704 and 706 based on the strengths of these signals. Based on the strength of a signal detected from television 704, mobile device 702 can estimate a distance 710 to television 704. Based on the strength of a signal detected from thermostat 706, mobile device can estimate a distance 708 to thermostat 706.

Mobile device 702 can compare the distances and/or the corresponding signal strengths to each other. Based on this comparison, mobile device 702 can select, from among television 704 and thermostat 706, a particular device from which mobile device 702 detected the strongest signal, or which mobile device 702 estimated to be the closest to itself. Mobile device 702 can select, from among GUIs 720 and 730, a particular GUI that corresponds to the particular device. Mobile device 702 can display this particular GUI.

For example, in response to estimating that distance 708 is less than distance 710, mobile device 702 can select and display GUI 720 that is associated with television 704. GUI 720 can include controls that are useful for controlling attributes of television 704. For another example, in response to estimating that distance 710 is less than distance 708, mobile device 702 can select and display GUI 730 that is associated with thermostat 706. GUI 730 can include controls that are useful for controlling attributes of thermostat 706.

In some embodiments, for each other wireless-capable device from which an accessory or companion device can detect a wireless signal, the accessory or companion device can store, in its memory, mappings between an identity of that wireless-capable device and the strengths of the wireless signals detected from that wireless-capable device at various points in time. The detected wireless signal can identify the wireless-capable device, for example.

When the user of the accessory or companion device uses the device to perform an operation, such as unlocking an electronic lock to a door of the user's house, the accessory or companion device can store a mapping between that operation and the historical signal strength patterns of the various wireless-capable devices from which the accessory or companion device detected wireless signals just prior to performing that operation. For example, during a minute prior to being instructed to unlock the door, the accessory or companion device might detect wireless signals from a wireless-capable thermostat growing increasingly stronger, in a pattern. The accessory or companion device can associate this pattern of increasing signals from the wireless-capable thermostat with the door unlocking operation.

In some embodiments, an accessory or companion device compares recently detected patterns of signal strengths from various wireless-capable devices to historical patterns of signal strengths from the same wireless-capable devices. Upon detecting that a recently detected pattern of signal strengths matches a historical pattern of signal strengths from the same wireless-capable device or set of devices, the accessory or companion device can automatically perform the operation associated with that historical pattern (e.g., a door-unlocking operation or a light-activating operation) automatically without manual intervention from the accessory or companion device's user.

C. Safeguards

As is discussed above, in some embodiments, a companion device and an accessory device can automatically perform operations relative to each other in response to at least one device determining that strengths of wireless signals that it detects from the other device consistently exceed a specified threshold. Such operations can include wireless data transfer between the devices, and/or one device unlocking the other locked device.

It might be possible for a third party, unrelated to the owner of the companion and accessory devices, to introduce into the environment a signal booster that detects signals from one of the devices and then amplifies those signals with greater strength, such that those stronger signals are then detected by the other one of the devices. Such nefarious activities could produce undesirable results for the owner of the devices, especially if the third party is thereby able to gain unauthorized access to private data stored on one of the devices due to the automatic unlocking described above.

In order to protect against such potential misuse, techniques described below attempt to verify the authenticity of environmental conditions before permitting automatic operations, such as device unlocking or wireless data transfer, to be performed.

1. Signal Strength History Analysis

In some embodiments, a detecting device can engage in an analysis of the history of the strengths of the wireless signals detected from the other device prior to performing automatic operations (e.g., unlocking, wireless data transfer, etc.) relative to that other device. The detecting device can determine, from the buffer in which the detected signal strengths are stored, whether any sharp increase in signal strength appears in the buffer entries. Such a sharp increase tends to indicate a phenomenon that is unlikely to have occurred naturally, since signal strength naturally tends to wax or wane only gradually as one of the devices incrementally moves closer to or farther from the other device over time.

In some embodiments, for each particular entry in its buffer (discussed above), the detecting device can examine the signal strength for that particular entry and the signal strengths for the entries neighboring that particular entry in the buffer. Because the detecting device can populate adjacent entries in the buffer over time, entries next to each other in the buffer can represent the temporally closest signal strength measurements. The detecting device can determine differences between the signal strength specified in the particular entry and the signal strengths specified in the entries neighboring, or adjacent to, that particular entry in the buffer.

In response to determining that the difference between the particular entry's signal strength and either of its neighboring entries' signal strengths exceeds a specified amount, the detecting device can refrain from performing the automatic operation (e.g., wireless data transfer, unlocking, etc.) that it otherwise would have performed in response to estimating that it was sufficiently close to the other paired device. In this manner, the detecting device can ensure that the measurements in the buffer are realistic before performing operations that could compromise the security of one or both devices.

Alternatively, if, for each particular entry's signal strength in the buffer, the difference between that signal strength and the signal strengths of the neighboring entries in the buffer do not exceed the specified amount, then the detecting device can proceed to perform the automatic operation (e.g., wireless data transfer, unlocking, etc.) in response to estimating that it is sufficiently close to the other paired device.

As is discussed above, in some embodiments, a detecting device can analyze historical changes in detected signal strengths in order to determine whether those changes are realistic. However, whether or not a particular change in signal strength during some time interval is realistic can depend on the speed at which the detecting device (often a worn accessory device) is travelling as it detects the wireless signals from the other device. In some embodiments, the threshold against which the detecting device compares historical changes in signal strength can vary depending on modes of travel that the detecting device was estimated to be using at the times that the detecting device detected the signals.

In some embodiments, each time that the detecting device detects a wireless signal from the other device, the detecting device estimates its current mode of travel, and stores an indication of that mode of travel within the buffer entry that indicates the detected strength of the signal. When the detecting device compares a change in signal strength to some threshold, the detecting device can select the threshold from a specified set of varying thresholds based on the mode of travel specified in the buffer entry.

For example, if the mode of travel was "walking," then the detecting device can select a relatively low threshold from the set of thresholds. For another example, if the mode of travel was "cycling," then the detecting device can select a relatively higher threshold from the set of thresholds. For yet another example, if the mode of travel was "driving," then the detecting device can select a still higher threshold from the set of thresholds. Faster modes of travel can be associated with higher thresholds.

In order to estimate its current mode of travel, the detecting device can periodically obtain a measurement from its accelerometer. A significant acceleration or deceleration is indicative of a potential change in mode of travel. The magnitude of the acceleration or deceleration is indicative of the mode of travel. For example, in response to detecting an acceleration from zero to 60 miles per hour in under ten seconds (or an equivalent acceleration over some other interval of time), the detecting device can estimate that it has entered a "driving" mode of travel. In response to detecting a correspondingly significant deceleration, the detecting device can estimate that it might no longer be in its former mode of travel.

In some embodiments, an accessory device and a companion device can communicate with each other using wireless channels other than Bluetooth even while those devices are not within range of engaging in Bluetooth communication with each other. For example, both devices may have WiFi capability, and both devices might be capable of accessing the Internet or some other wireless network. Under such circumstances, the accessory and companion devices can communicate with each other over the Internet or other network. The accessory and companion devices can inform each other about their current attributes. For example, the accessory and companion devices can transmit to each other their geographical location histories, their historical velocities, and their historical accelerations. The devices can use this information to determine whether they can and should perform automatic operations (e.g., wireless data transfer, unlocking, etc.) relative to each other.

2. Location History Corroboration

As a further safeguard, in some embodiments, the detecting device additionally maintains, in its memory, a history of the geographical coordinates at which it was historically located at various points in time. As the detecting device travels, the detecting device can use a global positioning system (GPS) in order to estimate its current geographical coordinates. Each time that the detecting device estimates its current geographical coordinates, the detecting device can store these coordinates in its memory in association with a timestamp that indicates the moment at which these coordinates were estimated. In some embodiments, the detecting device can use this geographical location history when analyzing whether the signal strengths stored in its buffer are realistic.

In some embodiments, the detecting device can map each particular signal strength entry in its buffer to corresponding geographical coordinates in its geographical location history. The mapping can be performed, for example, on the basis of similarities of timestamps. Using these mappings, the detecting device can determine how much the signal strength detected from the other device changed over each distance that the detecting device traveled in the past.

For each such distance and each such delta of signal strength change, the detecting device can calculate a ratio of the delta to the distance. The detecting device can determine, for each such ratio, whether that ratio exceeds a specified threshold. If any ratio exceeds the specified threshold, then this can indicate that the increase in detected signal strength was not realistic given the corresponding distance that the detecting device traveled.

In response to determining that any ratio exceeds the specified threshold, the detecting device can refrain from performing the automatic operation (e.g., wireless data transfer, unlocking, etc.) that it otherwise would have performed in response to estimating that it was sufficiently close to the other paired device. In this manner, the detecting device can ensure that the measurements in the buffer are realistic before performing operations that could compromise the security of one or both devices.

Alternatively, in response to determining that none of the ratios exceeds the specified threshold, the detecting device can proceed to perform the automatic operation (e.g., wireless data transfer, unlocking, etc.) in response to estimating that it is sufficiently close to the other paired device.

IV. Hardware Overview

Figure 8A:
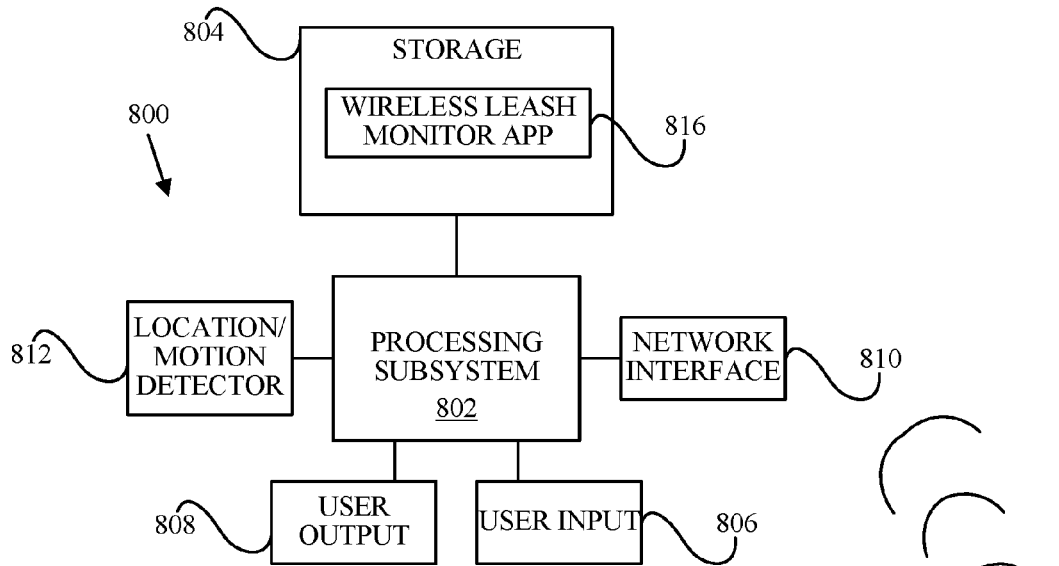
FIG. 8A is a simplified block diagram of an implementation of an accessory device according to some embodiments.

FIG. 8A is a simplified block diagram of an implementation of an accessory device 800 according to some embodiments. Device 800 can be a mobile device, a handheld device, a notebook computer, a desktop computer, or any suitable electronic device with a screen for displaying images and that is capable of communicating with a companion device 850 as described herein. In some embodiments, device 800 is a wearable device such as an Apple iPod, headphones, or a watch. Device 800 includes a processing subsystem 802, a storage subsystem 804, a user input device 806, a user output device 808, a network interface 810, and a location/motion detector 812.

Processing subsystem 802, which can be implemented as one or more integrated circuits (e.g., e.g., one or more single-core or multi-core microprocessors or microcontrollers), can control the operation of device 800. In various embodiments, processing subsystem 802 can execute a variety of programs in response to program code and can maintain multiple concurrently executing programs or processes. At any given time, some or all of the program code to be executed can be resident in processing subsystem 802 and/or in storage subsystem 804.

Through suitable programming, processing subsystem 802 can provide various functionality for device 800. For example, processing subsystem 802 can execute a wireless leash monitor program (or "app") 816. Wireless leash monitor app 816 can automatically and periodically attempt to detect wireless signals emanating from companion device 850. Wireless leash monitor app 816 can store indications of successful or unsuccessful signal detection, and the strengths of detected signals, in a buffer in storage subsystem 804. Wireless leash monitor app 816 can perform various embodiments described herein.

Storage subsystem 804 can be implemented, e.g., using disk, flash memory, or any other storage media in any combination, and can include volatile and/or non-volatile storage as desired. In some embodiments, storage subsystem 804 can store one or more application programs to be executed by processing subsystem 802 (e.g., wireless leash monitor app 816). In some embodiments, storage subsystem 804 can store other data (e.g., used by and/or defined by wireless leash monitor app 816). Programs and/or data can be stored in non-volatile storage and copied in whole or in part to volatile working memory during program execution.

A user interface can be provided by one or more user input devices 806 and one or more user output devices 808. User input devices 806 can include a touch pad, touch screen, scroll wheel, click wheel, dial, button, switch, keypad, microphone, or the like. User output devices 808 can include a video screen, indicator lights, speakers, headphone jacks, or the like, together with supporting electronics (e.g., digital-to-analog or analog-to-digital converters, signal processors, or the like). A customer can operate input devices 806 to invoke the functionality of device 800 and can view and/or hear output from device 800 via output devices 808.

Network interface 810 can provide voice and/or data communication capability for device 800. For example, network interface 810 can provide device 800 with the capability of communicating with companion device 850. In some embodiments, network interface 810 can include radio frequency (RF) transceiver components for accessing wireless voice and/or data networks (e.g., using cellular telephone technology, Bluetooth technology, advanced data network technology such as 5G, 4G or EDGE, WiFi (IEEE 502.11 family standards, or other mobile communication technologies, or any combination thereof), and/or other components). In some embodiments network interface 810 can provide wired network connectivity (e.g., Ethernet) in addition to or instead of a wireless interface. Network interface 810 can be implemented using a combination of hardware (e.g., antennas, modulators/demodulators, encoders/decoders, and other analog and/or digital signal processing circuits) and software components.

Location/motion detector 812 can detect a past, current or future location of device 800 and/or a past, current or future motion of device 800. For example, location/motion detector 812 can detect a velocity or acceleration of mobile electronic device 800. Location/motion detector 812 can comprise a Global Positioning Satellite (GPS) receiver and/or an accelerometer. In some instances, processing subsystem 802 determines a motion characteristic of device 800 (e.g., velocity) based on data collected by location/motion detector 812. For example, a velocity can be estimated by determining a distance between two detected locations and dividing the distance by a time difference between the detections.

Figure 8B:
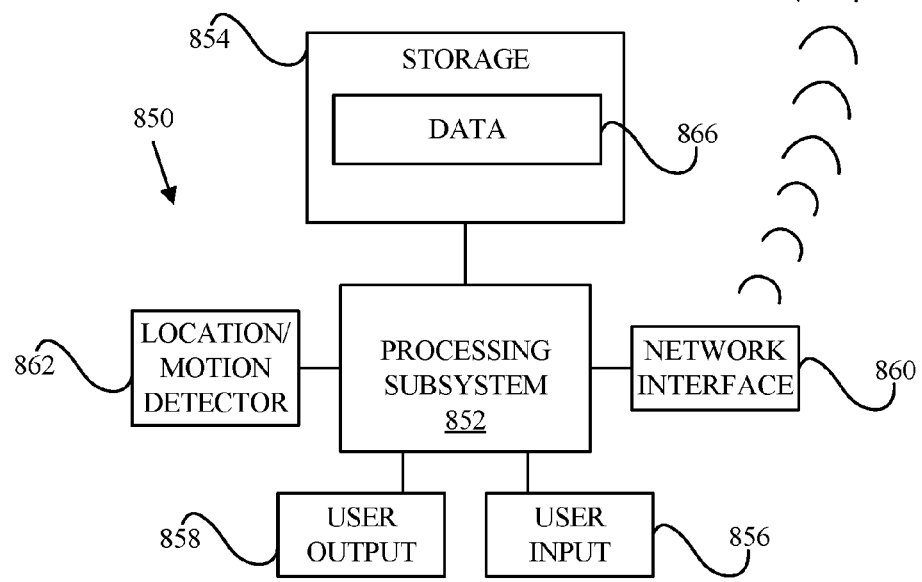
FIG. 8B is a simplified block diagram of an implementation of a companion device according to some embodiments.

FIG. 8B is a simplified block diagram of an implementation of a companion device 850 according to some embodiments. Companion device 850 includes a processing subsystem 852, storage subsystem 854, a user input device 856, a user output device 858, and a network interface 860. Network interface 860 can have similar or identical features as network interface 810 of device 800 described above. In some embodiments, companion device 850 can be an Apple iPhone.

Processing subsystem 852, which can be implemented as one or more integrated circuits (e.g., a conventional microprocessor or microcontroller), can control the operation of companion device 850. In various embodiments, processing subsystem 852 can execute a variety of programs in response to program code and can maintain multiple concurrently executing programs or processes. At any given time, some or all of the program code to be executed can be resident in processing subsystem 852 and/or in storage subsystem 854.

Through suitable programming, processing subsystem 852 can provide various functionality for companion device 850. Thus, companion device 850 can interact with wireless leash monitor app 816 being executed on device 800 in order to send wireless signals and/or data transmissions to device 800. In one embodiment, companion device 850 device emits wireless signals (e.g., Bluetooth signals) that accessory device 800 can detect and to which accessory device 800 can respond.

Storage subsystem 854 can be implemented, e.g., using disk, flash memory, or any other storage media in any combination, and can include volatile and/or non-volatile storage as desired. In some embodiments, storage subsystem 854 can store one or more application programs to be executed by processing subsystem 852. In some embodiments, storage subsystem 854 can store other data 866. Programs and/or data can be stored in non-volatile storage and copied in whole or in part to volatile working memory during program execution.

A user interface can be provided by one or more user input devices 856 and one or more user output devices 858. User input and output devices 856 and 858 can be similar or identical to user input and output devices 806 and 808 of device 800 described above. In some instances, user input and output devices 856 and 858 are configured to allow a programmer to interact with companion device 850.

It will be appreciated that accessory device 800 and companion device 850 described herein are illustrative and that variations and modifications are possible. A device can be implemented as a mobile electronic device and can have other capabilities not specifically described herein (e.g., telephonic capabilities, power management, accessory connectivity, etc.). In a system with multiple accessory devices 800 and/or multiple companion devices 850, different accessory devices 800 and/or companion devices 850 can have different sets of capabilities; the various accessory devices 800 and/or companion devices 850 can be but need not be similar or identical to each other.

Further, while accessory device 800 and companion device 850 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Various embodiments described herein can be realized in a variety of apparatus including electronic devices implemented using any combination of circuitry and software.

Additionally, while accessory device 800 and companion device 850 are described as singular entities, it is to be understood that each can include multiple coupled entities.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk may embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments described herein can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments described herein using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to some embodiments may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments described herein. However, other embodiments may be directed to specific embodiments relating to each individual aspect, or specific combinations of these individual aspects The above description of exemplary embodiments has been presented for the purposes of illustration and description. It is not intended to be exhaustive or to limit any invention to the precise form described, and many modifications and variations are possible in light of the teaching above. The embodiments were chosen and described in order to best explain the principles of inventions and their practical applications to thereby enable others skilled in the art to best utilize these inventions in various embodiments and with various modifications as are suited to the particular use contemplated.

What is claimed is:

1. A method comprising:
   at a first mobile device having one or more processors:
      establishing a wireless connection with a second mobile device;
      after the wireless connection is established, failing, at a first moment, to detect a signal from the second mobile device;
      storing, in a buffer, an indication of failure at the first moment;
      failing, at a second moment after the first moment, to detect a signal from the second mobile device;
      storing, in the buffer, an indication of failure at the second moment;
      determining, based on indications stored in the buffer, a number of times that the first mobile device failed to detect a signal from the second mobile device during a specified time period;
      determining that the number exceeds a specified threshold; and
      in response to determining that the number of times that the first mobile device failed to detect the signal from the second mobile device during the specified time period exceeds the specified threshold, generating an alert.

2. The method of claim 1, wherein generating the alert comprises:
   at the first mobile device:
      determining whether contact with skin is detected; and
      in response to determining that contact with skin is detected, generating the alert.

3. The method of claim 2, wherein in response to determining that contact with skin is not detected, locking the first mobile device to restrict use of the first mobile device.

4. The method of claim 1, further comprising:
   at the first mobile device:
   maintaining a history of motion of the first mobile device using an accelerometer of the first mobile device;
   determining, based on the history of motion, whether the first mobile device has moved within a particular period of time; and
   in response to determining that the first mobile device has moved within the particular period of time, generating the alert.

5. The method of claim 1, further comprising:
   at the first mobile device:
      receiving, from the second mobile device, at different times, indications of different locations of the second mobile device;
      storing the locations in association with the times;
      in response to determining that the number exceeds the specified threshold, selecting, from the locations, a particular location that is associated with a most recent time of the times; and
      displaying information that identifies the particular location.

6. The method of claim 5, further comprising:
   at the first mobile device:
      determining, at the different times, strengths of signals received from the second mobile device;
      storing the strengths of the signals in association with the times;
      in response to determining that the number exceeds the specified threshold, selecting, from the strengths of the signals, a particular strength that is associated with a most recent time of the times; and
      determining a radius based on the particular strength;
      wherein displaying comprises displaying a circular area having the radius and centered on the particular location.

7. The method of claim 5, further comprising in response to selecting the particular location, re-establishing a wireless leash with the second mobile device based on the selected particular location.

8. The method of claim 1, further comprising:
   at the first mobile device:
   in response to determining that the number exceeds the specified threshold, emitting one or more sounds in a particular pattern; and
   generating the alert in response to a determination that the one or more sounds were not detected by the second mobile device.

9. The method of claim 1, further comprising:
in response to determining that the number exceeds the specified threshold, displaying a last known location of the second mobile device.

10. The method of claim 1, wherein the detecting the signal from the second mobile device is performed at a predetermined frequency.

11. The method of claim 1, wherein the indication of failure at the first moment includes a timestamp at a time that the signal detection occurred.

12. The method of claim 1, wherein the alert comprises one of a visual alert, an audible alert and an audiovisual alert.

13. The method according to claim 1, wherein the wireless connection is established between the first mobile device and the second mobile device in order to pair the first mobile device and the second mobile device.

14. A computer product comprising a non-transitory computer-readable storage medium storing instructions executable by one or more processors of a first mobile device to cause the one or more processors to:
establish a wireless connection with a second mobile device;
after the wireless connection is established, fail, at a first moment, to detect a signal from the second mobile device;
store, in a buffer, an indication of failure at the first moment;
fail, at a second moment after the first moment, to detect a signal from the second mobile device;
store, in the buffer, an indication of failure at the second moment;
determine, based on indications stored in the buffer, a number of times that the first mobile device failed to detect a signal from the second mobile device during a specified time period;
determine that the number exceeds a specified threshold; and
generate an alert in response to determining that the number of times that the first mobile device failed to detect the signal from the second mobile device during the specified time period exceeds the specified threshold.

15. The computer product of claim 14, further comprising:
one or more processors communicably coupled with the non-transitory computer-readable storage medium, wherein the computer product is the first mobile device.

16. The computer product of claim 14, wherein generating the alert comprises:
determining whether contact with skin is detected; and
in response to determining that contact with skin is detected, generating the alert.

17. The computer product of claim 14, further comprising instructions to cause the one or more processors to:
maintain a history of motion of the first mobile device using an accelerometer of the first mobile device;
determine, based on the history of motion, whether the first mobile device has moved within a particular period of time; and
in response to determining that the first mobile device has moved within the particular period of time, generate the alert.

18. The computer product of claim 14, further comprising instructions to cause the one or more processors to:
receiving, from the second mobile device, at different times, indications of different locations of the second mobile device;
storing the locations in association with the times;
in response to determining that the number exceeds the specified threshold, selecting, from the locations, a particular location that is associated with a most recent time of the times; and
displaying information that identifies the particular location.

19. The computer product of claim 18, further comprising instructions to cause the one or more processors to:
determining, at the different times, strengths of signals received from the second mobile device;
storing the strengths of the signals in association with the times;
in response to determining that the number exceeds the specified threshold, selecting, from the strengths of the signals, a particular strength that is associated with a most recent time of the times; and
determining a radius based on the particular strength;
wherein displaying comprises displaying a circular area having the radius and centered on the particular location.

20. The computer product of claim 14, further comprising instructions to cause the one or more processors to:
in response to determining that the number exceeds the specified threshold, emit one or more sounds in a particular pattern; and
generate the alert in response to a determination that the one or more sounds were not detected by the second mobile device.

21. A device, comprising:
a memory; and
one or more processors configured to:
establish a wireless connection with a second mobile device;
after the wireless connection is established, fail, at a first moment, to detect a signal from the second mobile device;
store, in a buffer, an indication of failure at the first moment;
fail, at a second moment after the first moment, to detect a signal from the second mobile device;
store, in the buffer, an indication of failure at the second moment;
determine, based on indications stored in the buffer, a number of times that the first mobile device failed to detect a signal from the second mobile device during a specified time period;
determine that the number exceeds a specified threshold; and
in response to determining that the number of times that the first mobile device failed to detect the signal from the second mobile device during the specified time period exceeds the specified threshold, generate an alert.

* * * * *